(12) United States Patent
Williams

(10) Patent No.: US 11,846,118 B2
(45) Date of Patent: Dec. 19, 2023

(54) SECURE FOOD DELIVERY BOX APPARATUS

(71) Applicant: Lucan Williams, Whitby (CA)

(72) Inventor: Lucan Williams, Whitby (CA)

( * ) Notice: Subject to any disclaimer, the term of this patent is extended or adjusted under 35 U.S.C. 154(b) by 423 days.

(21) Appl. No.: 17/177,698

(22) Filed: Feb. 17, 2021

(65) Prior Publication Data

US 2022/0259891 A1 Aug. 18, 2022

(51) Int. Cl.
*E05B 47/00* (2006.01)
*A47J 41/00* (2006.01)
*E05G 1/04* (2006.01)
*A47J 47/14* (2006.01)

(52) U.S. Cl.
CPC ....... *E05B 47/0001* (2013.01); *A47J 41/0072* (2013.01); *A47J 41/0083* (2013.01); *A47J 47/14* (2013.01); *E05G 1/04* (2013.01)

(58) Field of Classification Search
CPC .. E05B 47/0001; E05B 65/52; A47J 41/0072; A47J 41/0083; A47J 47/14; E05G 1/04
USPC ................................. 340/5.73, 5.7
See application file for complete search history.

(56) References Cited

U.S. PATENT DOCUMENTS

| | | | | |
|---|---|---|---|---|
| 4,210,186 A * | 7/1980 | Belenson | ............... | A45C 11/38 190/110 |
| 5,207,303 A * | 5/1993 | Oswalt | ................. | A61B 50/312 206/570 |
| 6,238,091 B1 * | 5/2001 | Mogil | ................... | A45C 13/02 383/110 |
| 6,821,019 B2 * | 11/2004 | Mogil | ................... | A45C 11/20 383/110 |
| 9,399,434 B2 * | 7/2016 | Kennedy | ................ | B25H 3/022 |
| 9,809,376 B2 * | 11/2017 | Mitchell | .................. | A45F 3/02 |
| 9,930,997 B2 * | 4/2018 | Larpenteur | ............. | A47J 47/14 |
| 10,092,137 B1 * | 10/2018 | Nelson | ................ | A47J 41/0083 |
| 11,316,603 B2 * | 4/2022 | Topchy | .................. | H04H 60/58 |
| 11,317,748 B2 * | 5/2022 | Foster | ................ | G07C 9/00182 |
| 11,596,255 B2 * | 3/2023 | Cotton-Betteridge | ...................... | A47G 29/141 |
| 11,612,448 B2 * | 3/2023 | Gustafson | ............... | A45C 13/02 206/570 |
| 2001/0045449 A1 * | 11/2001 | Shannon | .................. | G07C 9/21 232/19 |
| 2005/0091988 A1 | 5/2005 | Stewart | | |
| 2007/0205243 A1 * | 9/2007 | Potts | ..................... | A45C 7/0063 224/539 |
| 2008/0069659 A1 * | 3/2008 | Carson | ............... | B65D 90/0066 410/103 |

(Continued)

FOREIGN PATENT DOCUMENTS

| | | | | |
|---|---|---|---|---|
| AU | 2018101196 A4 * | 9/2018 | ............. | B65H 75/02 |
| GB | 2590156 A * | 6/2021 | ............. | B60P 3/205 |

*Primary Examiner* — Nam V Nguyen

(57) ABSTRACT

A secure food delivery box apparatus for preventing food tampering during delivery includes a container body defining a body inside. A plurality of compartment walls is coupled within the body. A pair of handles is coupled to the container body. A lid is hingingly coupled to a body back side to selectively cover and uncover a body top side. A zipper is coupled to the container body and the lid. The zipper has a pair of zip bodies each having a zip loop. A zipper catch is coupled to the container body. The zipper catch selectively locks and releases the zip loop of each zip body. A digital keypad is coupled to the container body and is in operational communication with the zipper catch.

7 Claims, 6 Drawing Sheets

(56) References Cited

U.S. PATENT DOCUMENTS

| | | |
|---|---|---|
| 2015/0000571 A1 | 1/2015 | Stemen |
| 2016/0275450 A1 | 9/2016 | Chang |
| 2017/0305630 A1 | 10/2017 | Miller |
| 2022/0257041 A1 * | 8/2022 | Redford ............... B65D 11/186 |

* cited by examiner

SECURE FOOD DELIVERY BOX APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to food delivery devices and more particularly pertains to a new food delivery device for preventing food tampering during delivery.

(2) Description of Related Art Including Information Disclosed Under 37 CFR 1.97 and 1.98.

The prior art relates to food delivery devices. Known devices include package lock boxes and other forms of security boxes, as well as standard food delivery containers. These devices do not include internal ratchet straps and separated internal compartments. Existing devices also lack a locking slot to receive zipper pulls that is controlled by a digital keypad.

BRIEF SUMMARY OF THE INVENTION

An embodiment of the disclosure meets the needs presented above by generally comprising a container body having a body front side, a body back side, a body left side, a body right side, an open body top side, and a body bottom side defining a body inside. A plurality of compartment walls is coupled to the container body. Each compartment wall is coupled within the body inside and extends from the body front side to the body back side. A pair of handles is coupled to the container body. A lid is coupled to the container body. The lid is hingingly coupled to the body back side to selectively cover and uncover the body top side. A zipper is coupled to the container body and the lid. The zipper extends along the body top side above the body left side, the body front side, and the body right side. The zipper has a pair of zip bodies each having a zip loop. A zipper catch is coupled to the container body. The zipper catch selectively locks and releases the zip loop of each zip body. A digital keypad is coupled to the container body. The digital keypad is in operational communication with the zipper catch. The digital keypad has a CPU and a battery.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
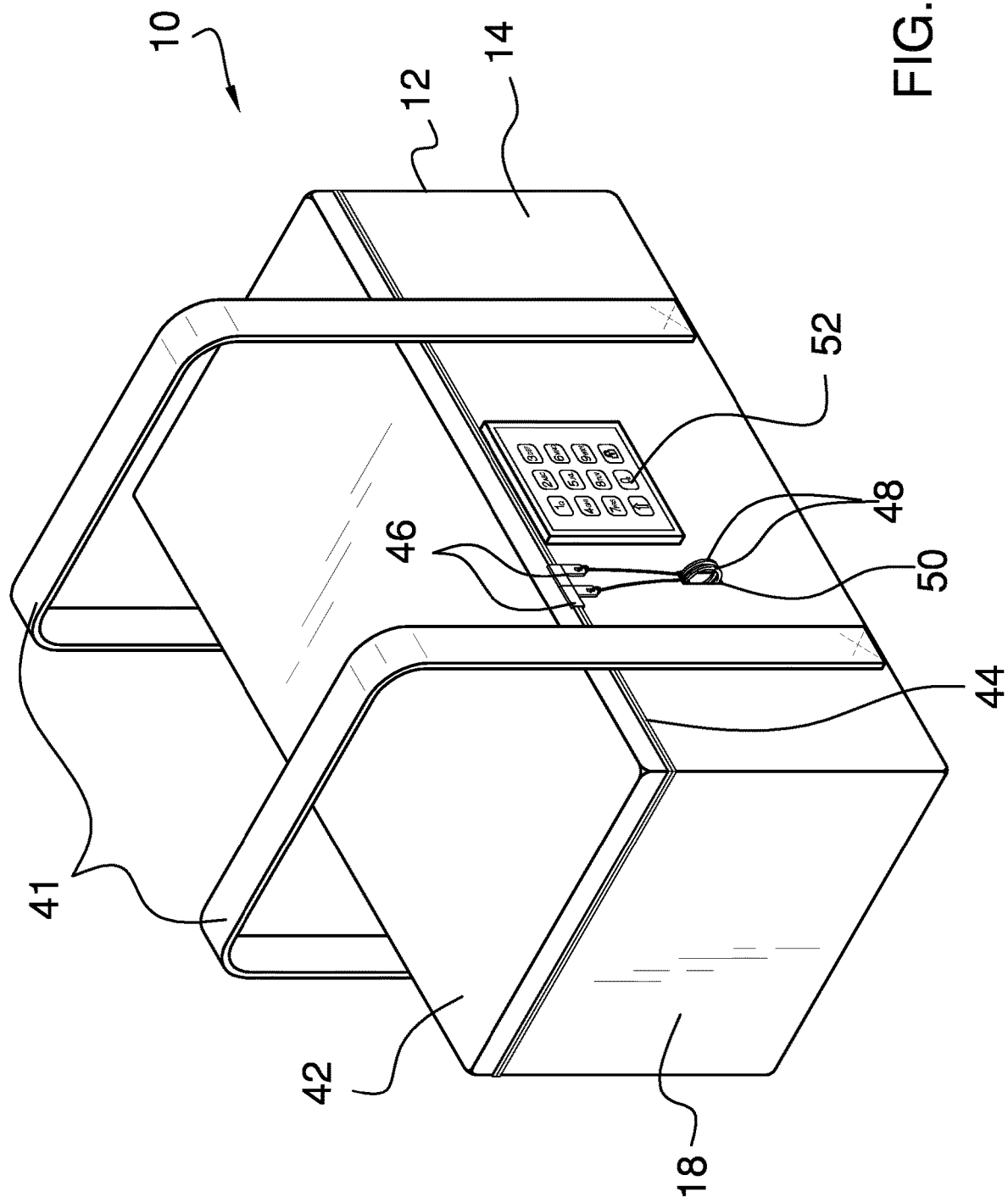
FIG. 1 is an isometric view of a secure food delivery box apparatus according to an embodiment of the disclosure.
Figure 2:
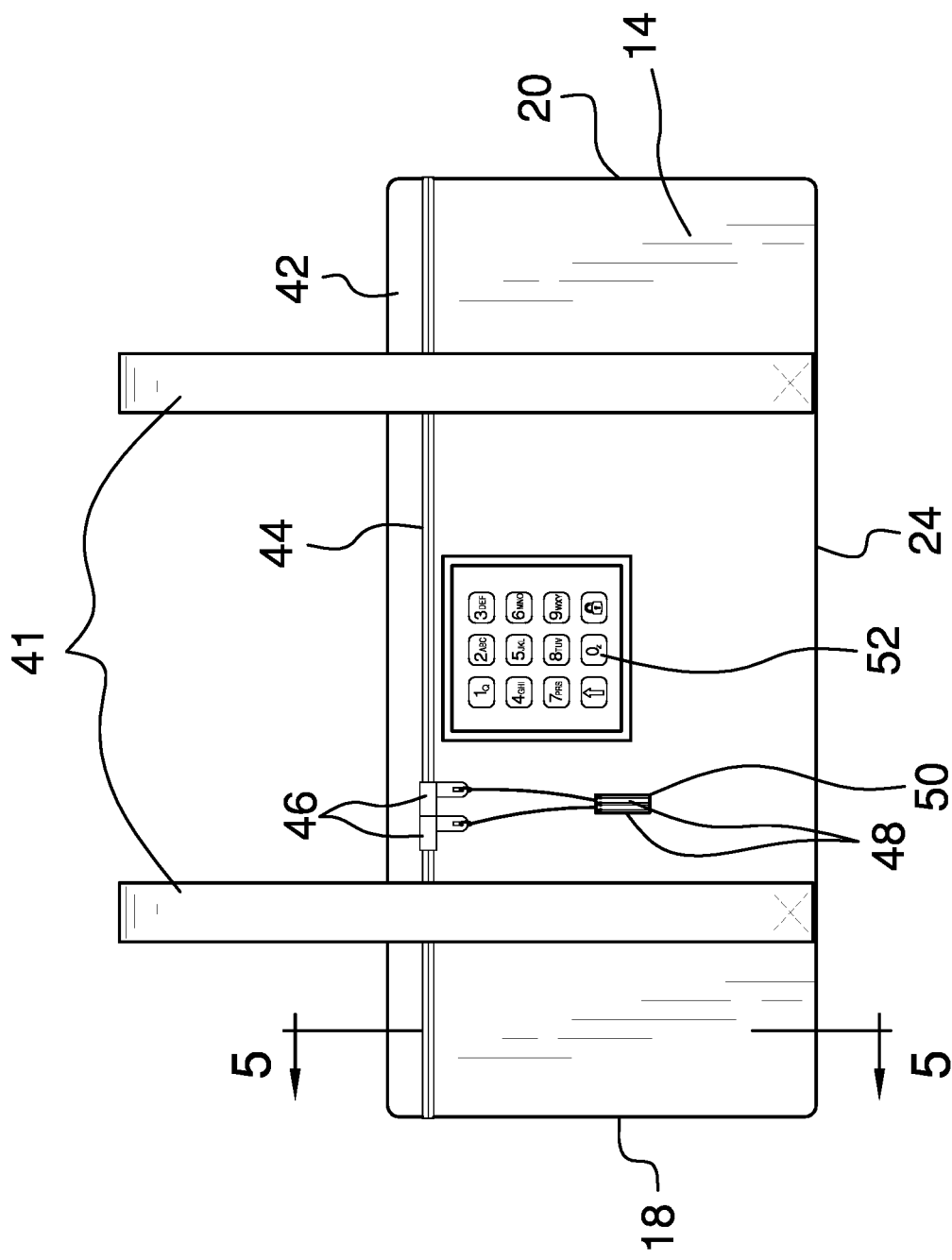
FIG. 2 is a front elevation view of an embodiment of the disclosure.
Figure 3:
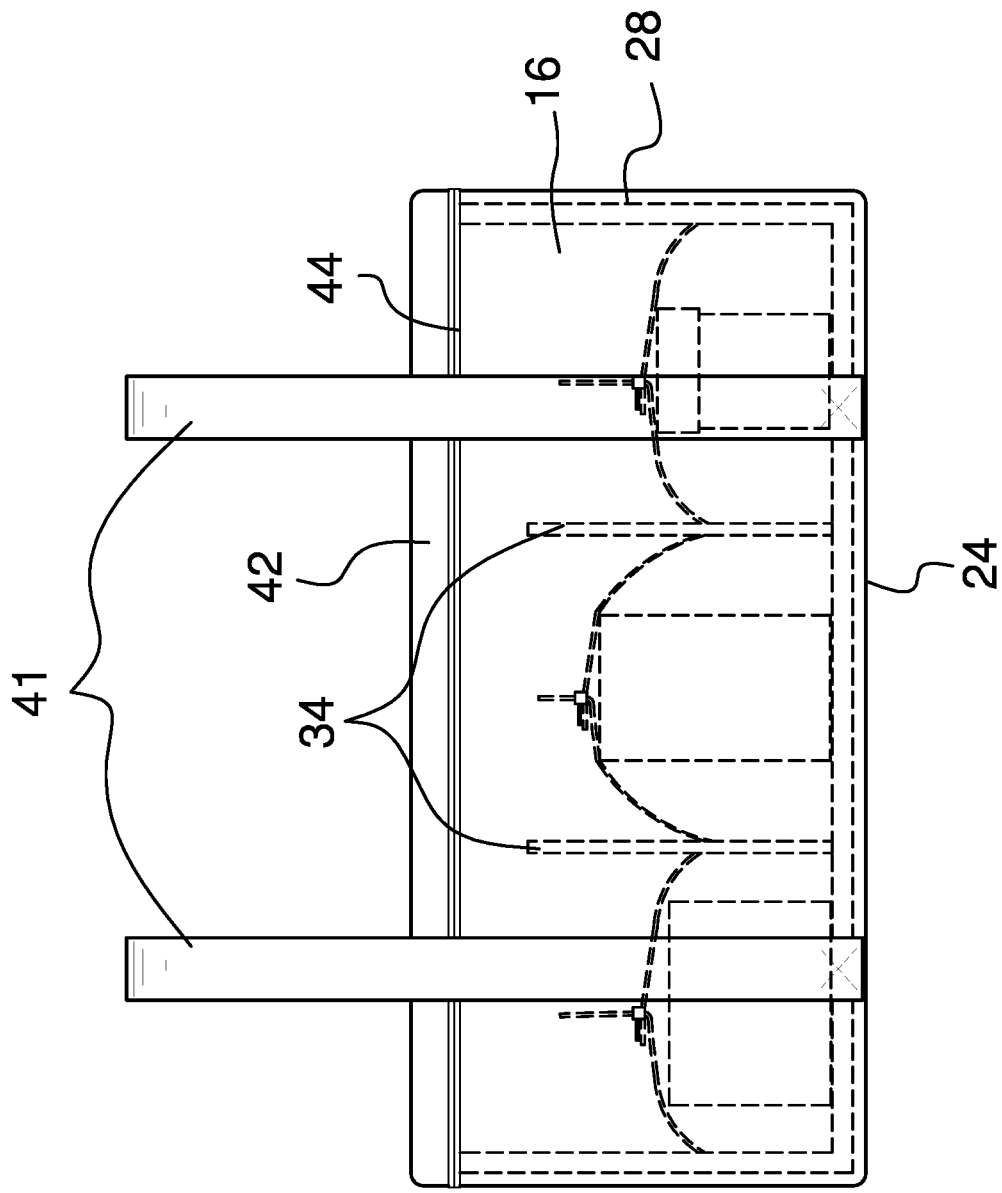
FIG. 3 is a rear elevation view of an embodiment of the disclosure.
Figure 4:
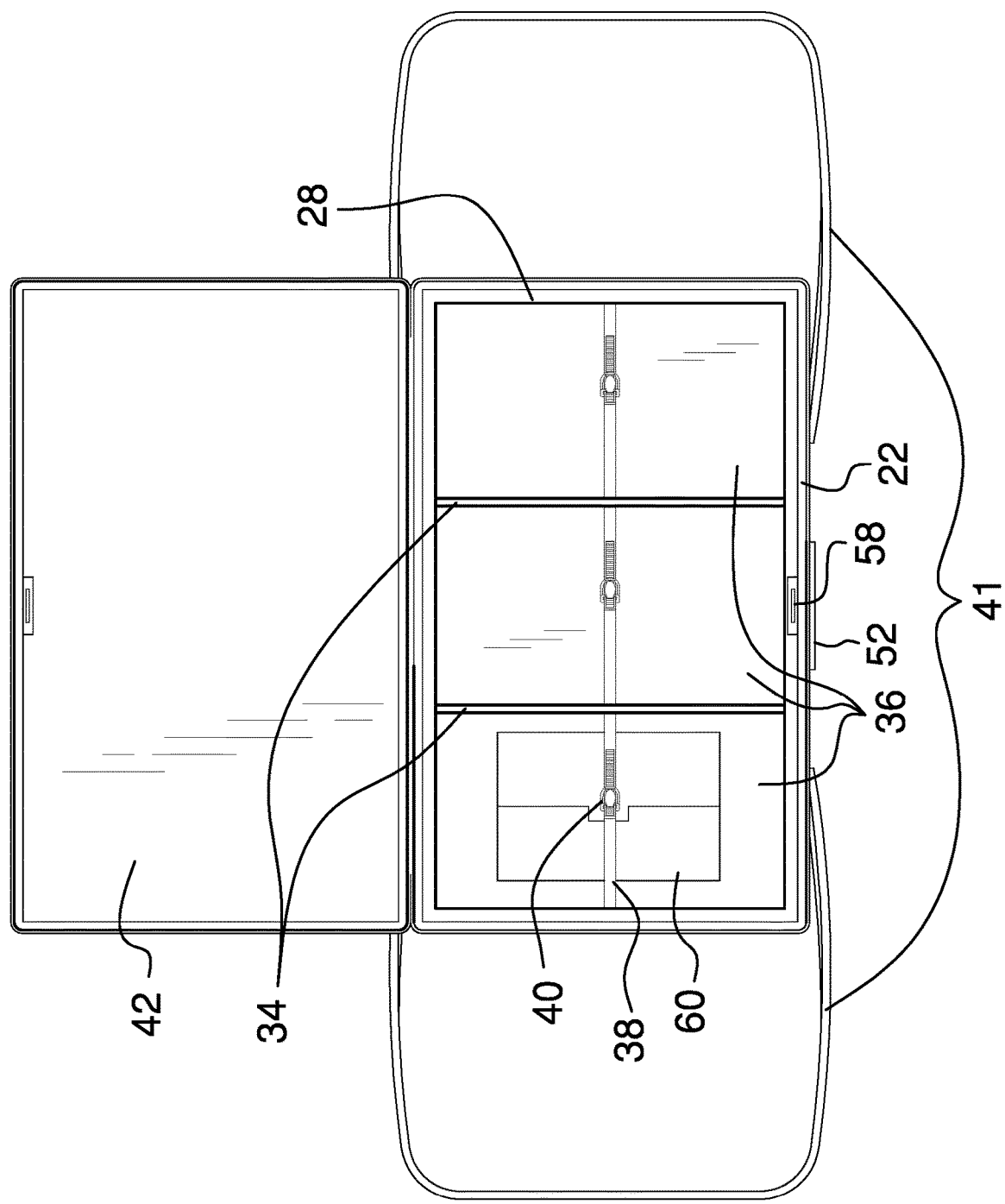
FIG. 4 is a top plan view of an embodiment of the disclosure.
Figure 5:
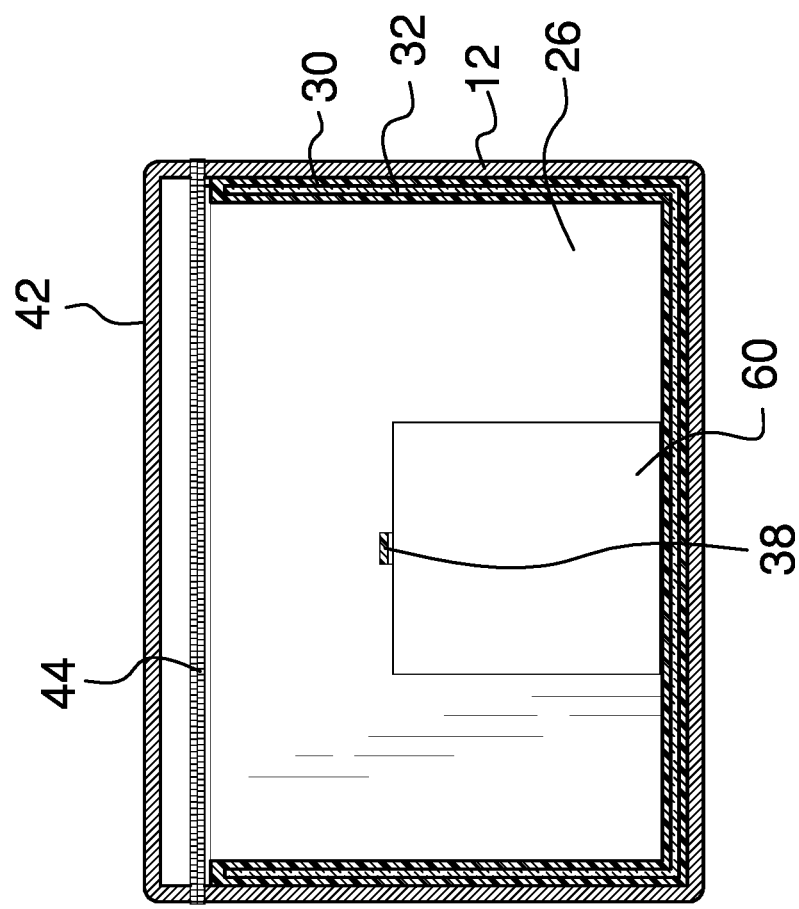
FIG. 5 is a cross-sectional view of an embodiment of the disclosure.
Figure 6:
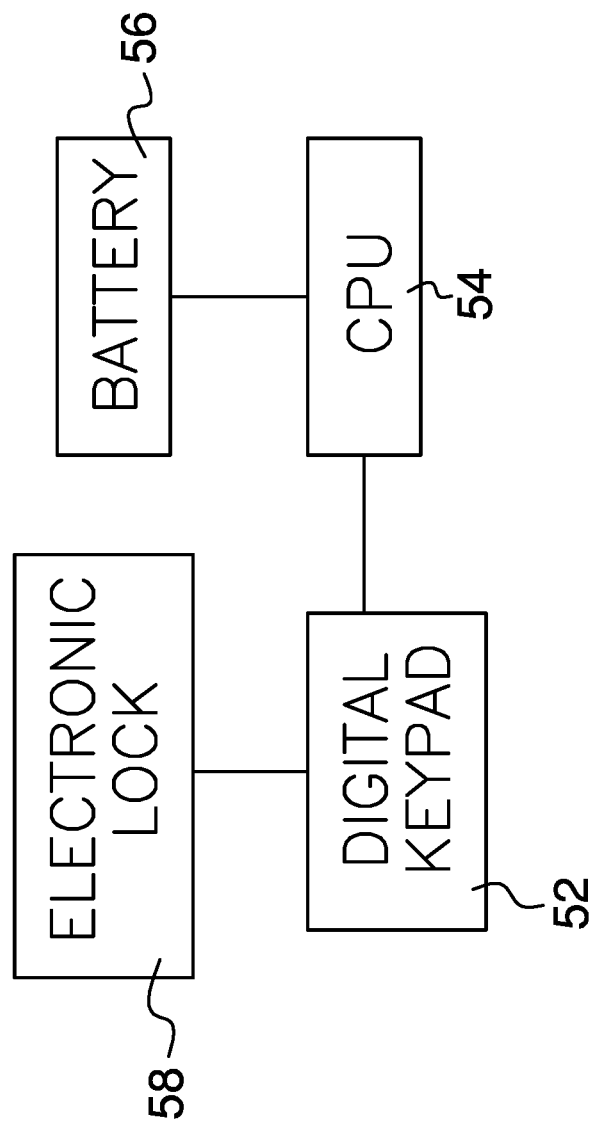
FIG. 6 is a box diagram of an embodiment of the disclosure.

With reference now to the drawings, and in particular to FIGS. 1 through 6 thereof, a new food delivery device embodying the principles and concepts of an embodiment of the disclosure and generally designated by the reference numeral 10 will be described.

As best illustrated in FIGS. 1 through 6, the secure food delivery box apparatus 10 generally comprises a container body 12 having a body front side 14, a body back side 16, a body left side 18, a body right side 20, an open body top side 22, and a body bottom side 24 defining a body inside 26. An insulated lining 28 is coupled to the container body 12 within the body inside 26 to maintain food temperature. The insulated lining 28 may have a rigid outer shell layer 30 and an inner insulation layer 32 coupled within the outer shell layer 30. The rigid outer shell layer 30 prevents deformation of the container body 12 to prevent damage to the food held there within.

A plurality of compartment walls 34 is coupled to the container body 12. Each compartment wall 34 is coupled within the body inside 26 and extends from the body front side 14 to the body back side 16. The plurality of compartment walls 34 defines a plurality of food compartments 36 to prevent comingling of food and to minimize movement within the container body 12. A plurality of straps 38 is coupled to the plurality of compartment walls 34. Each strap 38 may have a ratchet mechanism 40 to tighten down on the food held within the respective food compartment 36 to prevent movement.

A pair of handles 41 is coupled to the container body 12. The pair of handles 41 may be coupled to the body front side 14 and the body back side 16 and may extend all the way down to the body bottom side 24 to ensure the container body 12 does not tip. A lid 42 is coupled to the container body 12. The lid 42 is hingingly coupled to the body back side 16 to selectively cover and uncover the body top side 22.

A zipper 44 is coupled to the container body 12 and the lid 42. The zipper 44 extends along the body top side 22 above the body left side 18, the body front side 14, and the body right side 20. The zipper 44 has a pair of zip bodies 46 each having a zip loop 48. A zipper catch 50 is coupled to the container body 12. The zipper catch 50 may be coupled within the body front side 14. The zipper catch 50 selectively locks and releases the zip loop 48 of each zip body.

A digital keypad 52 is coupled to the container body 12. The digital keypad 52 is in operational communication with the zipper catch 50 to release the zip loops 48. The digital keypad 52 has a CPU 54 and a battery 56. An electronic lock 58 may be coupled to the container body 12. The electronic lock 58 may be in operational communication with the digital keypad 52.

In use, a plurality of food containers 60 is placed within each food compartment 36 and secured by the plurality of straps 38. The zipper 44 is then used to close the lid 42 and the zipper catch 50 secures the zip loops 48. The digital keypad 52 is then used to release the zip loops 48 and disengage the electronic lock 58 to access the food containers 60.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A secure food delivery box apparatus comprising:
    a container body having a body front side, a body back side, a body left side, a body right side, an open body top side, and a body bottom side defining a body inside;
    a plurality of compartment walls coupled to the container body, each compartment wall being coupled within the body inside and extending from the body front side to the body back side;
    a pair of handles coupled to the container body;
    a lid coupled to the container body, the lid being hingingly coupled to the body back side to selectively cover and uncover the body top side;
    a zipper coupled to the container body and the lid, the zipper extending along the body top side above the body left side, the body front side, and the body right side, the zipper having a pair of zip bodies each having a zip loop;
    a zipper catch coupled to the container body, the zipper catch selectively locking and releasing the zip loop of each zip body;
    a digital keypad coupled to the container body, the digital keypad being in operational communication with the zipper catch, the digital keypad having a central processing unit and a battery; and
    a plurality of straps coupled to the plurality of compartment walls such that each strap extends across a respective compartment formed by the plurality of compartment walls, each strap having a ratchet mechanism wherein each strap is configured for extending over contents of the respective compartment.

2. The secure food delivery box apparatus of claim 1 further comprising an insulated lining coupled to the container body within the body inside.

3. The secure food delivery box apparatus of claim 2 further comprising the insulated lining having a rigid outer shell layer and an inner insulation layer coupled within the outer shell layer.

4. The secure food delivery box apparatus of claim 1 further comprising the pair of handles being coupled to the body front side and the body back side.

5. The secure food delivery box apparatus of claim 1 further comprising an electronic lock coupled to the container body, the electronic lock being in operational communication with the digital keypad.

6. The secure food delivery box apparatus of claim 1 further comprising the zipper catch being coupled within the body front side.

7. A secure food delivery box apparatus comprising:
    a container body having a body front side, a body back side, a body left side, a body right side, an open body top side, and a body bottom side defining a body inside;
    an insulated lining coupled to the container body within the body inside, the insulated lining having a rigid outer shell layer and an inner insulation layer coupled within the outer shell layer;
    a plurality of compartment walls coupled to the container body, each compartment wall being coupled within the body inside and extending from the body front side to the body back side;
    a plurality of straps coupled to the plurality of compartment walls such that each strap extends across a respective compartment formed by the plurality of compartment walls, each strap having a ratchet mechanism wherein each strap is configured for extending over contents of the respective compartment;
    a pair of handles coupled to the container body, the pair of handles being coupled to the body front side and the body back side;
    a lid coupled to the container body, the lid being hingingly coupled to the body back side to selectively cover and uncover the body top side;
    a zipper coupled to the container body and the lid, the zipper extending along the body top side above the body left side, the body front side, and the body right side, the zipper having a pair of zip bodies each having a zip loop;

a zipper catch coupled to the container body, the zipper catch being coupled within the body front side, the zipper catch selectively locking and releasing the zip loop of each zip body;

a digital keypad coupled to the container body, the digital keypad being in operational communication with the zipper catch, the digital keypad having a central processing unit and a battery; and an electronic lock coupled to the container body, the electronic lock being in operational communication with the digital keypad.

\* \* \* \* \*